US012070438B2

(12) United States Patent
Molzberger

(10) Patent No.: US 12,070,438 B2
(45) Date of Patent: Aug. 27, 2024

(54) FEEDING BOTTLE FOR MILK FOR SMALL CHILDREN

(71) Applicant: Snoozi GmbH, Cologne (DE)

(72) Inventor: Fabian Molzberger, Cologne (DE)

(73) Assignee: SNOOZI GMBH, Cologne (DE)

( * ) Notice: Subject to any disclaimer, the term of this patent is extended or adjusted under 35 U.S.C. 154(b) by 97 days.

(21) Appl. No.: 17/703,019

(22) Filed: Mar. 24, 2022

(65) Prior Publication Data

US 2022/0218568 A1 Jul. 14, 2022

Related U.S. Application Data

(63) Continuation of application No. PCT/EP2020/078649, filed on Oct. 12, 2020.

(30) Foreign Application Priority Data

Oct. 16, 2019 (DE) ........................ 102019127967.4

(51) Int. Cl.

| | |
|---|---|
| ***A61J 9/00*** | (2006.01) |
| ***A61J 9/02*** | (2006.01) |
| ***A61J 11/00*** | (2006.01) |
| ***A61J 11/04*** | (2006.01) |
| ***H05B 1/02*** | (2006.01) |

(52) U.S. Cl.

CPC ................ *A61J 9/008* (2013.01); *A61J 9/02* (2013.01); *A61J 11/0085* (2013.01); *A61J 11/04* (2013.01); *H05B 1/0269* (2013.01); *A61J 2200/42* (2013.01)

(58) Field of Classification Search

CPC . A61J 9/008; A61J 9/02; A61J 11/0085; A61J 11/04; A61J 2200/42; H05B 1/0269

USPC ........................................................ 215/11.4

See application file for complete search history.

(56) References Cited

U.S. PATENT DOCUMENTS

| | | | | |
|---|---|---|---|---|
| 2,793,776 | A * | 5/1957 | Lipari | A61J 9/00 215/11.1 |
| 5,419,445 | A | 5/1995 | Kaesemeyer | |
| 6,962,254 | B2 * | 11/2005 | Spector | B65D 51/2828 215/250 |
| 2008/0251063 | A1 | 10/2008 | Palena | |
| 2010/0219149 | A1 | 9/2010 | Tien | |
| 2017/0094721 | A1 | 3/2017 | Moore | |
| 2019/0269578 | A1 * | 9/2019 | Goodin | A47J 36/2433 |

FOREIGN PATENT DOCUMENTS

| | | | | |
|---|---|---|---|---|
| CN | 105816332 | | 8/2016 | |
| CN | 105816332 | A * | 8/2016 | |
| CN | 105816332 | A | 8/2016 | |
| DE | 19744526 | A1 * | 4/1999 | A61J 9/02 |
| DE | 19909577 | | 9/2000 | |
| DE | 202010013766 | U1 | 2/2011 | |
| DE | 202010013766 | U1 * | 3/2011 | A61J 9/00 |
| DE | 102015118242 | A1 | 4/2017 | |
| JP | H0648670 | U | 7/1994 | |

(Continued)

*Primary Examiner* — Don M Anderson
*Assistant Examiner* — Jessica Kavini Tamil
(74) *Attorney, Agent, or Firm* — Von Rohrscheidt Patents

(57) ABSTRACT

A feeding bottle configured to receive milk for small children, the feeding bottle including a water bottle; a suction nipple; a heater; a milk powder depot that is separate from the water bottle; and a temperature sensor coupled to the heater.

11 Claims, 7 Drawing Sheets

(56) References Cited

FOREIGN PATENT DOCUMENTS

| | | | | | |
|---|---|---|---|---|---|
| JP | 3163484 | U | 10/2010 | | |
| JP | 2012235852 | | 12/2012 | | |
| JP | 2012235852 | A | 12/2012 | | |
| JP | 2013188290 | A | 9/2013 | | |
| JP | 3212113 | U | 8/2017 | | |
| WO | WO2013/164619 | | 11/2013 | | |
| WO | WO2013164619 | A1 | 11/2013 | | |
| WO | WO2018/068493 | | 4/2018 | | |
| WO | WO2018068493 | A1 | 4/2018 | | |
| WO | WO-2018068493 | A1 * | 4/2018 | .............. | A47J 36/24 |

* cited by examiner

FEEDING BOTTLE FOR MILK FOR SMALL CHILDREN

RELATED APPLICATIONS

This application is a continuation of International patent application PCT/EP2020/078649 filed on Oct. 12, 2020 claiming priority from German patent application DE 10 2019 127 967.4 filed on Oct. 16, 2019, both of which are incorporated in their entirety by this reference.

FIELD OF THE INVENTION

The invention relates to a feeding bottle for milk for small children.

BACKGROUND OF THE INVENTION

Generic feeding bottles are well known in the art. The known feeding bottles are used for feeding small children during the day but also during the night.

A problem when using the feeding bottles during the night occurs when a time period from a first awakening of the small child which indicates that the small child needs to be fed until readiness of a milk bottle that has the right temperature is long enough so that the small child is woken up completely and only goes back to sleep after a rather long time period after the drinking is completed.

BRIEF SUMMARY OF THE INVENTION

It is an object of the invention to provide a novel feeding bottle configured to receive milk for small children that facilitates starting a feeding process any time with minimum time delay.

The object is achieved by a feeding bottle configured to receive milk for small children, the feeding bottle including a water bottle; a suction nipple; a heater; a milk powder depot that is separate from the water bottle; and a temperature sensor coupled to the heater, wherein the feeding bottle includes a separate milk powder storage depot and the heater includes a temperature sensor.

The feeding bottle according to the invention has the advantage that a drinking bottle with water at a drinkable temperature and a milk powder reservoir are provided at the instant when first indications of hunger are audible from the small child which immediately provides drinkable milk after a short mixing process. Thus, it is advantageously prevented that the child wakes up completely and is then awake for a longer time period.

This also prevents that the mother, the father or siblings of the small child wake up completely and cannot go back to sleep again for a longer time period.

An advantageous embodiment of the invention is characterized in that the heater keeps the water that is filled into the water bottle and heated at a temperature of 37° C., after cooling down during nocturnal hours.

This device has the advantage that boiling water can be filled into the bottle before the sleeping period so that it is germ free and cools during the first hours of sleep due to heat dissipation slowly to a drinking temperature of 37° C. wherein a heating device is configured so that a drinking temperature of 37° C. is maintained. This provides a germ free content and on the other hand side low energy consumption since the heater only needs very low power.

Furthermore it is unlikely that the small child that has been fed before going to sleep wakes up within the cooling period from 100° C. down to 37° C. for the bottle content so that this does not pose a problem either for a quick provision of a feeding bottle ready to drink for receiving milk for small children.

Advantageously the temperature sensor of the heating device can cooperate with LEDs wherein the LEDs indicate a temperature that is too low, too high or nominal through different LED colors as a function of the temperature of the water that is filled in.

Thus, a person feeding the small child can determine instantaneously after waking up whether the water provided in the feeding bottle has the right temperature.

In another advantageous embodiment of the invention, the milk powder depot includes an actuatable opening that is closeable again after use. Thus, the milk powder depot can be emptied very quickly into the water depot so that a mixture ready to drink can be produced by brief shaking. Producing finished ready to drink milk is not possible in the evening due to health reasons since the milk would be unfit for consumption and pose a health hazard after being heated for hours due to bacteria included in the milk powder.

Advantageously, it is also possible that the milk powder depot includes an opening device that is manually actuatable so that milk can be mixed anytime. Using this opening device that is actuatable e.g. by a finger facilitates emptying the milk powder depot immediately when required and producing a mixture ready to drink by brief shaking.

Advantageous the opening device can be formed by a disengageable base element of the milk powder depot and a plunger element whose actuation surface reaches into the suction nipple that is arranged above the milk powder depot so that the plunger element is manually actuatable through the suction nipple. In the opening device of this type, a plunger element and an annular portion of the disengagable base element is formed from hard plastic material.

Additionally the base element is formed in an advantageous embodiment in the center of the annular portion from a flexible synthetic material membrane in order to provide pressure balancing when the filled in heated water is cooled

BRIEF DESCRIPTION OF THE DRAWINGS

Further advantages of the invention can be derived from the subsequent description of an embodiment with reference to drawing figures, wherein.

DETAILED DESCRIPTION OF THE INVENTION

Figure 1:
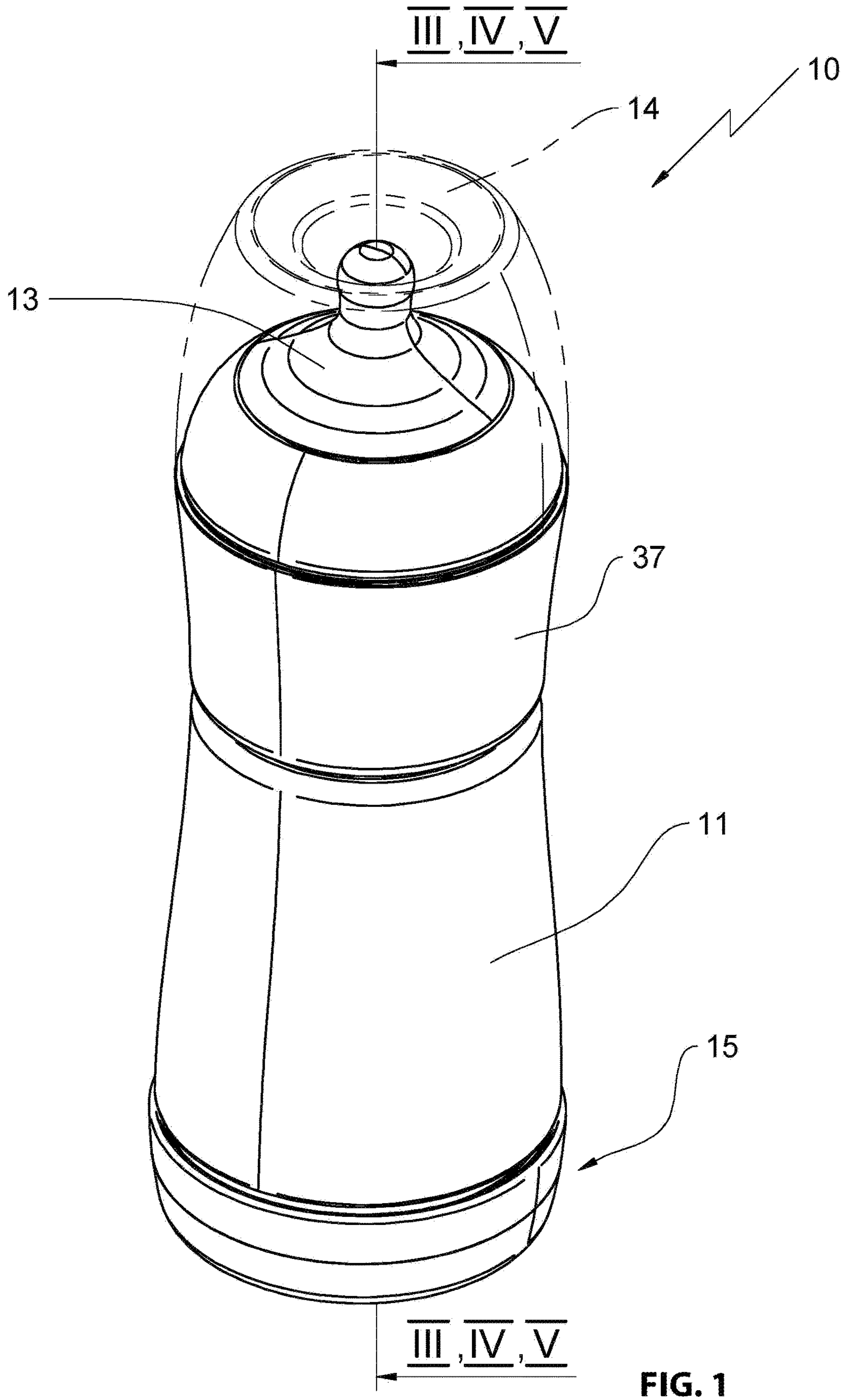
FIG. 1 illustrates a perspective view of a feeding bottle configured to receive milk for small children.

In the drawing figures a feeding bottle for receiving milk for small children is designated overall with reference numeral 10.

Figure 2:
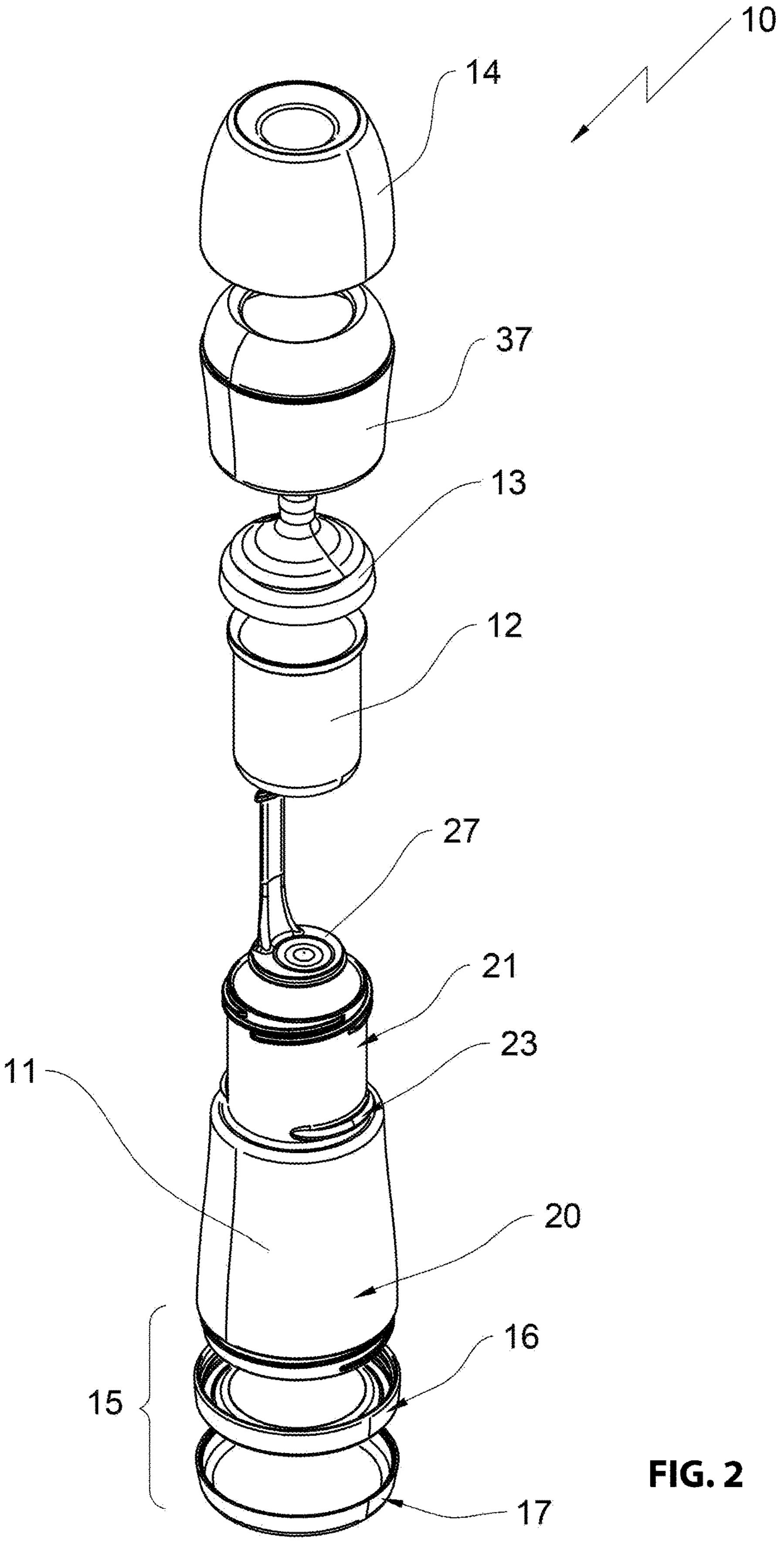
FIG. 2 illustrates an exploded view of the feeding bottle according to FIG. 1.

FIG. 1 illustrates the feeding bottle 10 with a water bottle 11 made from synthetic material, a milk powder depot 12 (c.f. FIG. 2) a suction nipple 13 and a cover 14. The water bottle 11 is fixed at a base element 15.

Figure 3:
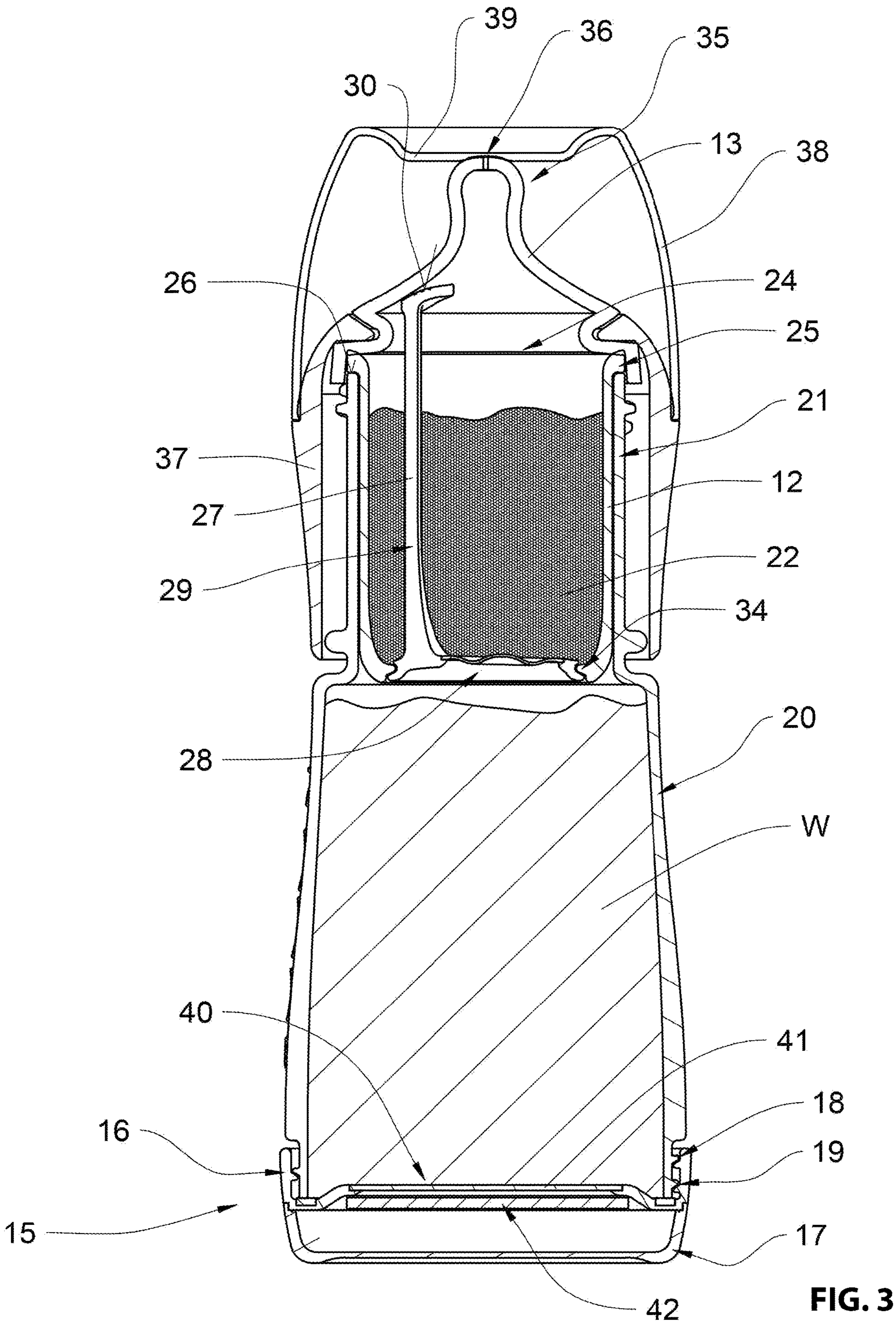
FIG. 3 illustrates a sectional view of the suction bottle according to the sectional lines III, IV, V/III, IV, V in FIG. 1

The feeding bottle 10 is shown in FIG. 2 in an exploded view. Viewed from below the base 15 made from two components 16, 17 is visible wherein the base can be screwed from below onto the water bottle 11. Thus, the water bottle 11 (c.f. FIG. 3) includes a thread 18 which corresponds to a thread 19 of the base element 15.

Figure 6:
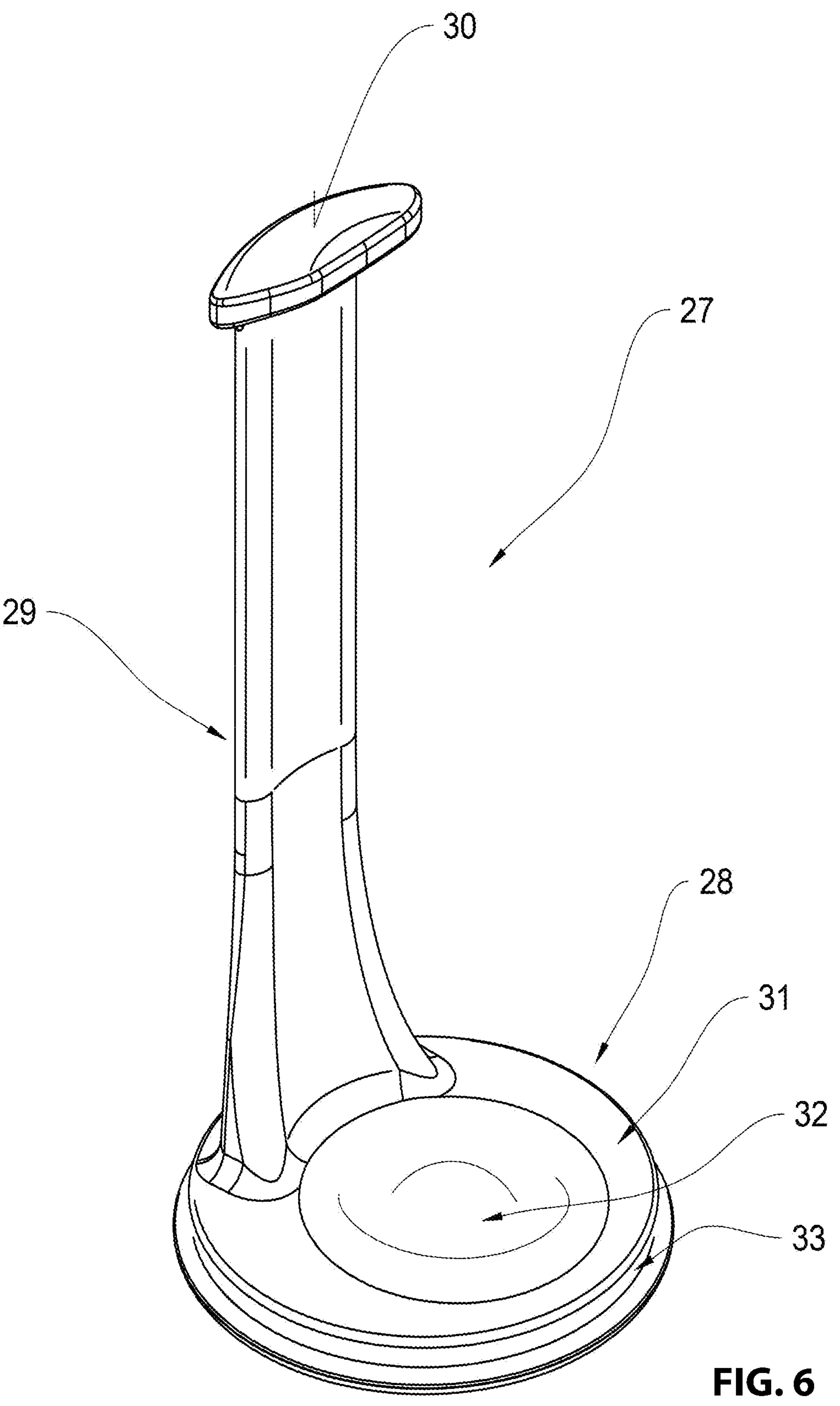
FIG. 6 illustrates a perspective view of the opening device.

The water bottle 11 is provided with a lower water receiving portion 20 and an upper receiving portion 21 for a milk powder depot 12, wherein an outer thread 23 is formed at the upper receiving portion 21 at an outside of the water bottle 11, wherein the outer thread is used for attaching a suction nipple ring 37, The milk powder depot 12 includes an outward protruding collar 25 at an upper fill in opening 24, wherein the outward protruding collar is supported on a circumferential face 26 of the upper receiving portion 21 of the water bottle 11 as shown in FIG. 3. The base of the milk powder depot 12 is closed by an openable opening device 27 (FIGS. 3, 6) which includes a base element 28 and a plunger element 29 that is provided with an actuation surface 30 which protrudes out of the milk powder depot 12 into an interior of the suction nipple 13.

While the actuation surface 30 of the plunger 29 and an annular portion of the base element 28 is formed from hard synthetic material (cf. FIG. 6) the center of the base element 28 is configured as a flexible synthetic material membrane 32, whereas the opening device 27 is overall coextruded from hard and soft synthetic material.

The flexible synthetic material membrane 32 serves the purpose of compensating pressure differences that are created when cooling the filled in water that has been heated to 100 degrees C. into the water bottle 11.

The annular portion of the base element 28 includes a circumferential interlocking groove 33 at an outside while the milk powder depot 12 forms a circumferentially protruding interlocking ring 34 at a base side. With this configuration it is possible to interlock the opening device 27 from below into the milk powder depot 12 so that a closed container for the milk powder 22 is created that can be opened anytime.

A suction nipple 13 is arranged on the circumferential collar 25 of the milk powder depot 12 wherein the suction nipple includes a suction protrusion 37 including a suction opening 36.

The suction nipple 13 is initially inserted into the suction nipple ring 37 from below. Then the suction nipple ring 37 is threaded with its inner thread onto the thread 23 at the receiving portion 21 of the water bottle 11 which also fixes the suction nipple 13 between the suction ring 37 and the collar 25 of the milk powder depot 12 is.

Last not least, a cover 38 is positionable on the suction nipple ring 37 wherein the cover 38 has a recess at a topside wherein the recess contacts and seals the suction opening 36.

It is evident from FIG. 3 that the base element 15 is threaded onto the water bottle 11 due to the cooperation of the threads 18 and 19 of the water bottle 11.

Additionally, the opening device 27 is interlocked in the milk powder depot 12 and the milk powder depot 12 is inserted into the upper receiving portion 21 of the water bottle 11 after filling water with approximately 100 degrees C. into the lower receiving portion 20. Thereafter the milk powder 22 is filled into the milk powder depot 12. After inserting the suction nipple 13 into the suction nipple ring 37 the suction nipple ring 37 is threaded into the exterior thread 23 of the upper receiving portion 21 of the water bottle 11 so that the suction nipple 13 fixed at the feeding bottle 10. Thus the feeding bottle 10 is ready for use during the night.

From the drawing figures its evident that a recessed base 40 of the water bottle 11 includes a stainless steel plate 41, wherein a plate shaped heater 42 is arranged below the base 40 using a double sided heat conducting tape.

Figure 7:
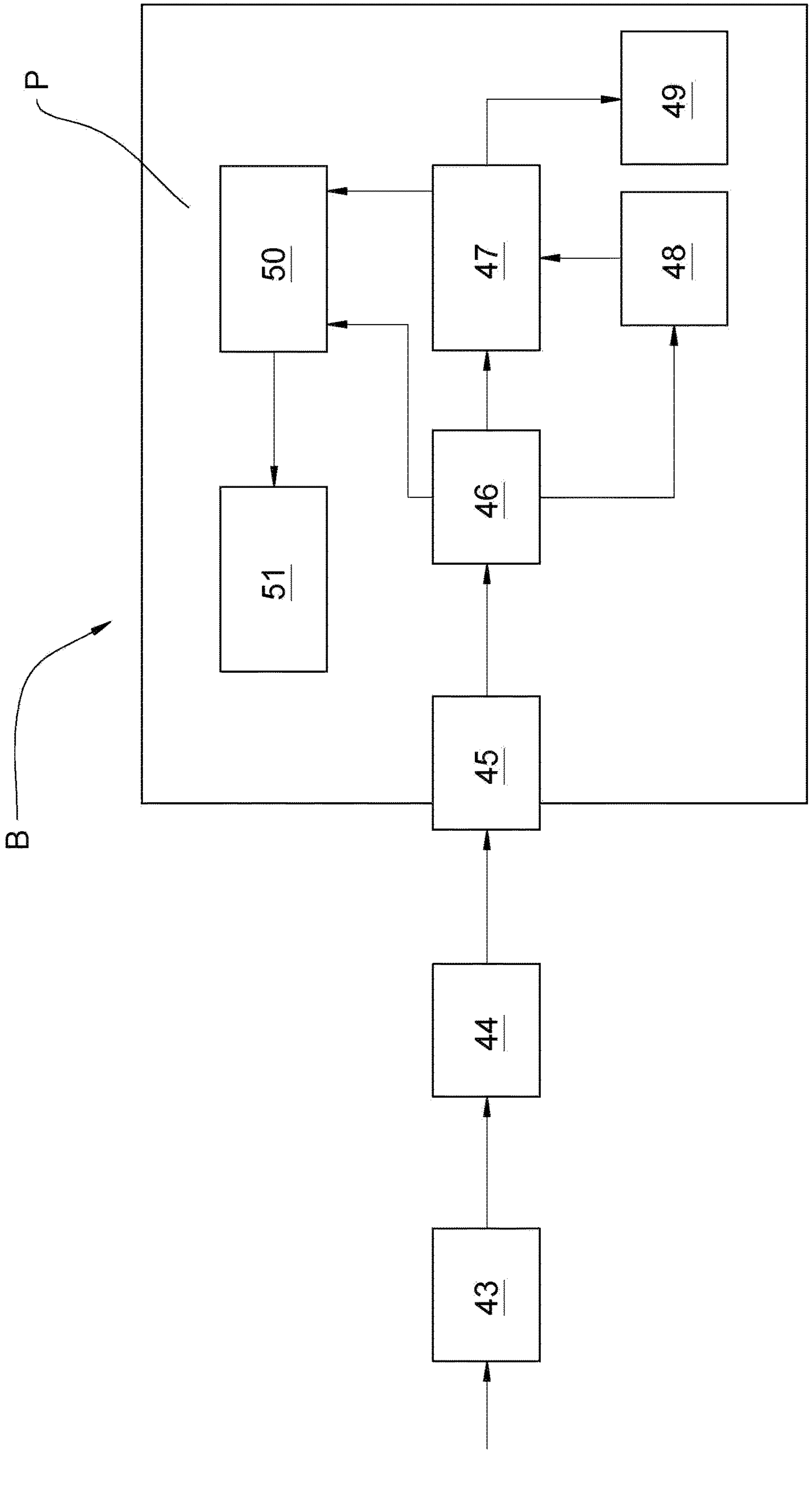
FIG. 7 illustrates a circuit diagram of the heater.

FIG. 7 shows a block diagram B of the heater 42 of the feeding bottle 10 for receiving milk for small children. A printer circuit board P is shown that is provided with SMD components at a bottom side.

The circuit board P is provided with power through an AC/DC USB adapter 33 and a USB cable that is insertable in a magnet bushing 45.

The circuit board P furthermore includes a filter/protective switch 46. This component includes a filter configured to pass EMV tests for CE certification and protective mechanisms which do not permit an unsafe condition of the appliance, e.g. with respect to fire protection.

Additionally the circuit board P includes a double comparator circuit 47 for a two level controller and for detecting the point for initial heating (37 degrees C.) after filling.

Furthermore the circuit board P is also provided with a component with 3 LEDs 49 with different colors in addition to a temperature sensor 48 wherein the LEDs can indicate a high temperature, the nominal temperature (37 degrees C.) and a low temperature.

Last not least a power switch 50 controls a heater 51 formed from four to eight resistors.

Figure 4:
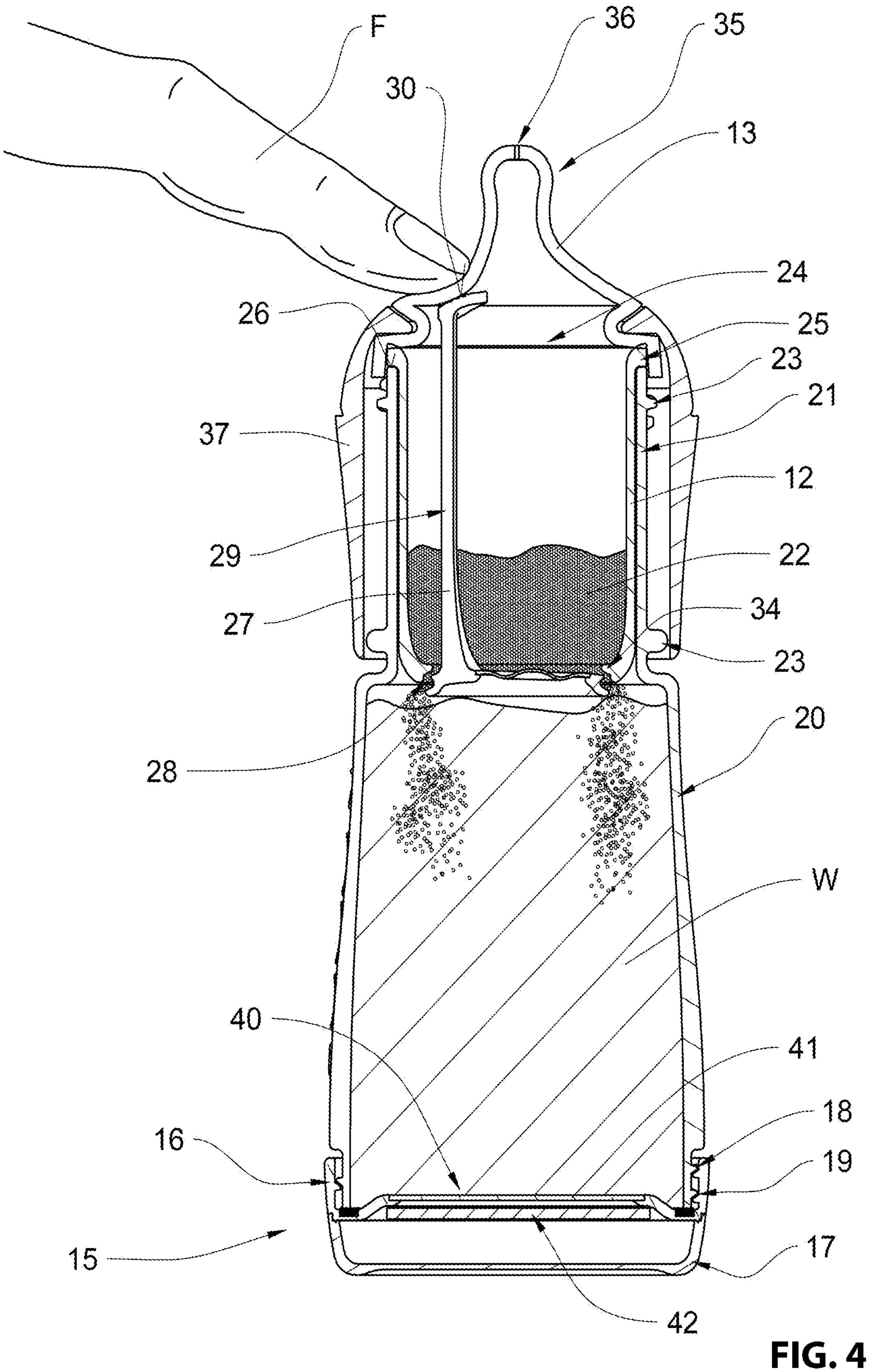
FIG. 4 illustrates a sectional view of the suction bottle according to FIG. 1 without cover while emptying the milk powder depot.
Figure 5:
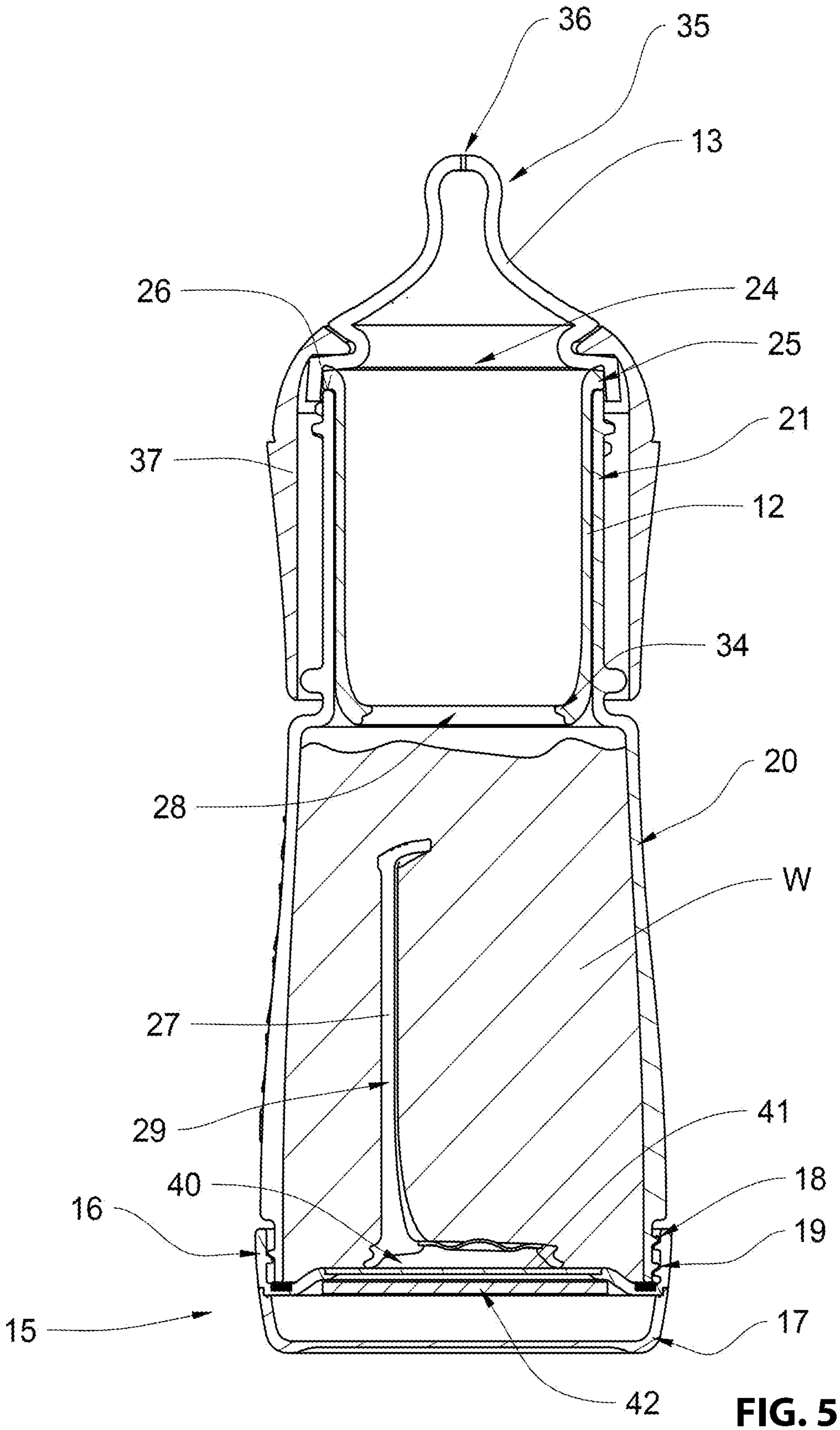
FIG. 5 illustrates a representation according to FIG. 4 after emptying the milk powder depot.

FIGS. 4-5 show a start-up of the feeding bottle 10.

In case a small child indicates a need for feeding at night, the feeding bottle 10 that is heated to 37 degrees C. is available to the user.

After removing the magnet plug 44 (cf. FIG. 7) and removing the cover 14 a finger F presses through the suction nipple 13 onto the actuation surface 30 of the opening device 27. Thus, the base element 28 of the opening device 27 is unlocked so that the milk powder depot 12 is opened and the milk powder 22 drops into the water bottle 11 (cf. FIGS. 4-5). After some shaking the milk mixture is ready and can be fed to the small child.

REFERENCE NUMERALS AND DESIGNATIONS

10 feeding bottle
11 water bottle
12 milk powder depot
13 suction nipple
14 cover
15 base element
16 portion of 15
17' portion of 15
18 thread
19 thread
20 lower water receiving portion
21 upper receiving portion
22 milk powder
23 outer thread
24 upper fill in opening
25 collar of 22
26 circumferential face of 11
27 opening device
28 base element of 27
29 plunger element of 27
30 actuation surface of 27

31 annular portion of 28
32 flexible synthetic material membrane
33 circumferential interlocking groove
34 protruding interlocking ring of 22
35 suction nipple protrusion
36 suction opening
37 suction ring
38 cover
39 boss
40 recess base of 11
41 stainless steel plate
42 heater
43 AC/DC USB adapter
44 USB cable with tow pole magnetic plug
45 magnet bushing
46 filter-/protective switch
47 comparator circuit
48 temperature sensor
49 LED
50 power switch
51 heater
B circuit diagram
P circuit board
F finger
W hot water

What is claimed is:

1. A feeding bottle configured to receive milk for small children, the feeding bottle comprising:

a water bottle;

a suction nipple;

a heater;

a milk powder depot that is separate from the water bottle and connected to the suction nipple at a circumferential collar of the milk powder depot;

a temperature sensor coupled to the heater;

wherein the milk powder depot includes an opening device that is manually openable to connect the milk powder depot with the water bottle so that the milk is mixable;

wherein the opening device includes a plunger, wherein the plunger includes an actuation surface and a component that forms a base of the milk powder depot when the opening device is closed, wherein the actuation surface protrudes into the suction nipple arranged above the milk powder depot when the opening device is closed so that the opening device is openable by manually deforming the suction nipple to contact and impart pressure upon the actuation surface which disengages the plunger and the base from the milk powder depot by moving the plunger and the base relative to the circumferential collar of the milk powder depot so that the milk powder depot is connected with the water bottle and the milk is mixable.

2. The feeding bottle according to claim 1, wherein the water bottle is configured to receive hot water above 37 degrees C., and wherein the heater maintains the hot water filled into the water bottle at a temperature of approximately 37 degrees C. after the hot water has cooled down to approximately 37 degrees C.

3. The feeding bottle according to claim 1, wherein the temperature sensor cooperates with LEDs which indicate a temperature that is too low, a nominal temperature of 37 degrees C. and a temperature that is too high through different light colors as a function of a temperature of the water filled into the water bottle.

4. The feeding bottle according to claim 1, wherein the milk powder depot includes an actuatable opening that is closeable again after use.

5. The feeding bottle according to claim 1, wherein the plunger and an annular portion of the disengagable base is formed from hard synthetic material.

6. The feeding bottle according to claim 1, wherein the base is formed from a flexible synthetic material membrane in a center of the annular portion so that the base facilitates a pressure balancing when the hot water cools.

7. The feeding bottle according to claim 1, wherein the annular portion of the base includes a circumferential interlocking groove for a protruding interlocking ring that is circumferentially arranged at the milk powder depot.

8. The feeding bottle according to claim 1, wherein the feeding bottle includes a disengagable cover that covers the suction nipple, and wherein a bottom of the disengageable cover includes a boss that contacts and seals at the suction nipple.

9. The feeding bottle according to claim 1, wherein the heater is arranged below a metal base of the water bottle.

10. The feeding bottle according to claim 9, wherein the heater is formed by at least one resistor arranged in a circuit.

11. The feeding bottle according to claim 9, wherein the power supply of the heater is provided from an outside through an AC/DC USB adapter which includes a USB cable with a two pole magnet plug that is fixable in a magnet bushing.

* * * * *